A. A. JONES.
Car-Starter.

No. 167,340.

Patented Aug. 31, 1875.

Witnesses: M. M. Jones, Harrison Gilmore

Inventor: A. A. Jones

UNITED STATES PATENT OFFICE.

ANTHONY A. JONES, OF UTICA, NEW YORK, ASSIGNOR TO HIMSELF AND JULIUS F. CHESEBROUGH, OF SAME PLACE.

IMPROVEMENT IN CAR-STARTERS.

Specification forming part of Letters Patent No. 167,340, dated August 31, 1875; application filed December 26, 1874.

*To all whom it may concern:*

Be it known that I, ANTHONY A. JONES, of Utica, in the county of Oneida and State of New York, have invented a new and Improved Car-Starter; and I do hereby declare that the following is a full, clear, and exact description of the same, reference being had to the accompanying drawing, forming a part of this specification, in which—

Figure 1:
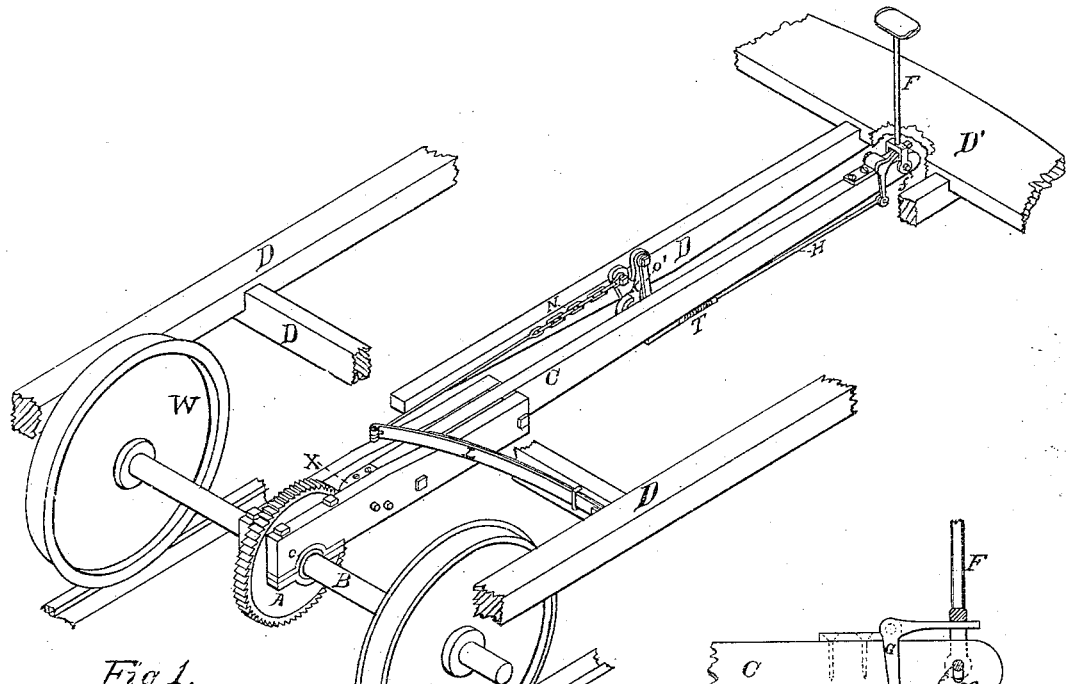
Figure 3:
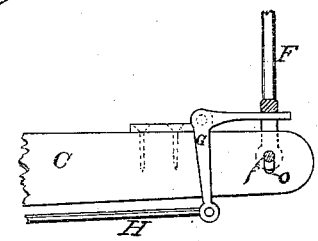
Figure 4:
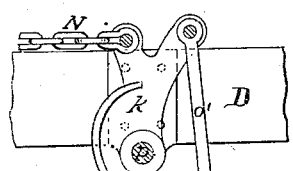
Figure 2:
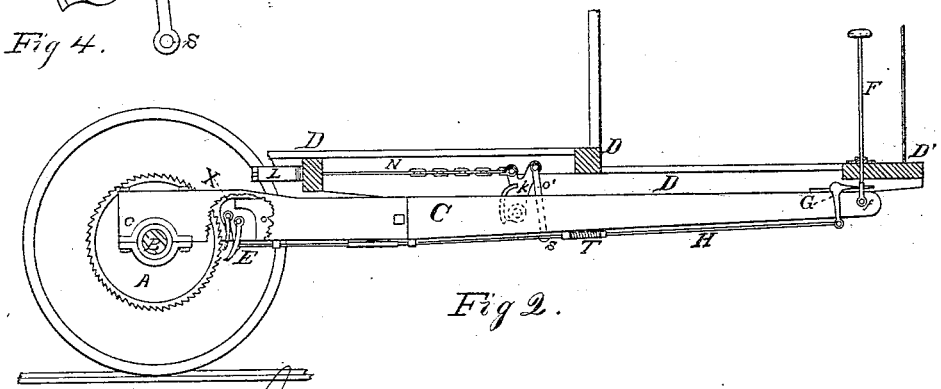

Figure 1 is a perspective view of my invention as applied to the axle of a car, and Fig. 2 a longitudinal section. Figs. 3 and 4 are detail views, showing certain parts enlarged.

The invention relates to the mode, hereinafter described, of connecting the foot-rod which projects up through the platform of the car with the pawl, rod, and lever which operate the ratchet-wheel mounted on the front axle.

Referring to the drawing, the wheels W W and ratchet-wheel A are fast on the axle. The latter is arranged in the bifurcation of lever C, and is engaged by one or the other of pawls E whenever the free end of lever C is depressed. The means of operating the pawls E is a rod, H, having a retracting-spring, T, and connected with one arm of an elbow-lever, G, which is pivoted to the front end of lever C. The other arm of the elbow-lever projects forward horizontally through a yoke or fork of the foot-rod F, which latter projects up through the platform D' of the car, and is connected to the lever C by a bolt, $f$, passing through a vertical slot, $o$, therein, as clearly shown in Fig. 3. The action of spring T on the lever G serves to support the rod F, so that the said bolt $f$ is at the upper end of the slot whenever no pressure is being applied to it. To maintain the lever C in the elevated or horizontal position represented in the drawing, and thus in readiness for action when it is desired to start the car, I employ a semi-elliptic spring, L, connecting-rod or chain N, elbow-lever K pivoted to the frame D of the car, and the link $o'$.

It will be seen that when the driver applies his foot to the plate on the rod F, the horizontal arm of the elbow-lever G is depressed, thereby causing rod H to carry one or the other of pawls E into engagement with ratchet A. Simultaneously with this engagement the bolt $f$ of rod F reaches the lower end of the slot $o$, and the pressure is thenceforth applied directly to the lever so long as it continues.

The advantage of this construction and arrangement of parts is that, in place of the heaviest pressure which the driver is able to exert being sustained by the pawl-rod H, it is applied directly to the main lever C. A small light rod may therefore be employed in place of the stout and heavy one heretofore required, and the pressure is also applied more effectively to the end of the lever C than is practicable when the foot-rod is pivoted directly to an elbow-lever, as in the patent above referred to.

The respective lengths of the pawls E are such that they divide the space of a tooth of ratchet-wheel A. Hence, one or the other of the pawls will lock with the wheel, without a perceptible or material loss of motion occurring.

I am aware a foot-rod working through the platform of a car, and inclosed by a tube that limits its play, also an elbow and main lever, and ratchet and pawl, have been heretofore combined to form a car-starting mechanism.

What I claim is—

The combination, with the main lever C, having the vertical slot $o$, of the foot-rod F, having the yoke and bolt $f$, the elbow-lever G, rod H, a pawl, and a ratchet-wheel fast on the axle, as shown and described.

A. A. JONES.

Witnesses:
 M. M. JONES,
 HARRISON GILMORE.